(12) United States Patent
Rho et al.

(10) Patent No.: US 11,275,516 B2
(45) Date of Patent: Mar. 15, 2022

(54) HOST SYSTEM CONFIGURED TO MANAGE ASSIGNMENT OF FREE BLOCK, DATA PROCESSING SYSTEM INCLUDING THE HOST SYSTEM, AND METHOD OF OPERATING THE HOST SYSTEM

(71) Applicant: SAMSUNG ELECTRONICS CO., LTD., Suwon-si (KR)

(72) Inventors: Eunhee Rho, Seoul (KR); Suman Prakash Balakrishnan, Bangalore (IN); Dongjin Kim, Hwaseong-si (KR); Seokhwan Kim, Seoul (KR); Chansol Kim, Hwaseong-si (KR); Jaeyoon Choi, Seoul (KR); Hyejeong Jang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 16/857,953

(22) Filed: Apr. 24, 2020

(65) Prior Publication Data
US 2021/0103394 A1    Apr. 8, 2021

(30) Foreign Application Priority Data
Oct. 2, 2019  (KR) .................. 10-2019-0122655

(51) Int. Cl.
G06F 3/06  (2006.01)

(52) U.S. Cl.
CPC ............ *G06F 3/0629* (2013.01); *G06F 3/064* (2013.01); *G06F 3/0619* (2013.01);
(Continued)

(58) Field of Classification Search
CPC .... G06F 12/0246; G06F 12/023; G06F 3/064; G06F 3/0652; G06F 2212/7211;
(Continued)

(56) References Cited

U.S. PATENT DOCUMENTS 7,797,481 B2   9/2010  Lee et al.
8,300,463 B2  10/2012  Park et al.
(Continued)

FOREIGN PATENT DOCUMENTS

KR    10-2018-0035271 A1    4/2018

OTHER PUBLICATIONS

Wikipedia, "Heap (data structure)", Jul. 12, 2019, The Internet Archive, pp. 1-6 https://web.archive.org/web/20190712004953/ https://en.wikipedia.org/wiki/Heap_(data_structure) (Year: 2019).*
(Continued)

*Primary Examiner* — Reginald G Bragdon
*Assistant Examiner* — Curtis James Kortman
(74) *Attorney, Agent, or Firm* — Sughrue Mion, PLLC

(57) ABSTRACT

A host system configured to communicate with a storage system, including a host flash translation layer (FTL) configured to manage a plurality of blocks included in the storage system, wherein the host FTL includes a block assignment module configured to generate priority information indicating priorities of free blocks from among the plurality of blocks based on erase count values of the free blocks, and wherein the host FTL is configured to assign a free block having a lowest erase count value, from among the free blocks, for a data write operation based on the priority information; a counting circuit configured to count a number of erase operations performed on each of the plurality of blocks; and an interface circuit configured to transmit to the storage system a block address along with an access request to the storage system, the block address indicating a position of the assigned free block.

20 Claims, 12 Drawing Sheets

(52) U.S. Cl.
CPC .......... *G06F 3/0652* (2013.01); *G06F 3/0653* (2013.01); *G06F 3/0679* (2013.01); *G06F 2212/7205* (2013.01)

(58) Field of Classification Search
CPC .... G06F 3/0629; G06F 3/0619; G06F 3/0653; G06F 3/0679; G06F 3/0616; G06F 2212/7205; G06F 2212/1032; G06F 2212/1036; G06F 2212/7201; G06F 2212/7208
See application file for complete search history.

(56) References Cited

U.S. PATENT DOCUMENTS

| | | | |
|---|---|---|---|
| 8,447,915 | B2 | 5/2013 | Araki et al. |
| 8,473,668 | B2 | 6/2013 | Kim et al. |
| 8,892,812 | B2 | 11/2014 | Ou |
| 9,436,595 | B1* | 9/2016 | Benitez ............... G06F 12/0246 |
| 2011/0320688 | A1 | 12/2011 | Lee |
| 2013/0054878 | A1 | 2/2013 | Lee et al. |
| 2014/0215129 | A1* | 7/2014 | Kuzmin .............. G06F 12/0246 711/103 |
| 2017/0109089 | A1* | 4/2017 | Huang .................. G06F 3/0685 |
| 2018/0088841 | A1 | 3/2018 | Ma et al. |
| 2019/0171372 | A1 | 6/2019 | Szubbocsev |
| 2019/0212922 | A1* | 7/2019 | Zhang .................. G06F 3/0652 |
| 2020/0401331 | A1* | 12/2020 | Mulani ................. G06F 3/0659 |

OTHER PUBLICATIONS

Nezar Abdennur, "pqdict", Jun. 23, 2018, The Internet Archive, Quickstart page, pp. 1-5 https://web.archive.org/web/20180623034410/https://pqdict.readthedocs.io/en/latest/intro.html (Year: 2018).*

* cited by examiner (Linked List)

HOST SYSTEM CONFIGURED TO MANAGE ASSIGNMENT OF FREE BLOCK, DATA PROCESSING SYSTEM INCLUDING THE HOST SYSTEM, AND METHOD OF OPERATING THE HOST SYSTEM

CROSS-REFERENCE TO RELATED APPLICATION

This application is based on and claims priority under 35 U.S.C. § 119 to Korean Patent Application No. 10-2019-0122655, filed on Oct. 2, 2019, in the Korean Intellectual Property Office, the disclosure of which is incorporated by reference herein in its entirety.

BACKGROUND

1. Field

The present disclosure relates to a host system, and more particularly, to a host system configured to manage the assignment of free blocks, a data processing system including the host system, and a method of operating the host system.

2. Description of Related Art

An example of a storage system that is based on a flash memory device may be a solid-state drive (SSD). Interfaces used for a storage system, such as the SSD, may include serial advanced technology attachment (SATA), peripheral component interconnect-express (PCIe), and serial attached small-computer system interface (SCSI) (SAS). Also, an interface that is based on a PCIe bus of related art, such as a non-volatile memory express (NVMe), has been proposed.

An example of an SSD may be an open-channel SSD. In the case of the open-channel SSD, various functions, for example an address translation operation, that have previously been performed in an SSD may be performed on a side of a host system. As an example, when the host system includes a flash translation layer (FTL), the host system may directly perform various management operations. In this case, a method of effectively performing a wear-leveling process by the host system in an open-channel SSD environment has not been proposed. Thus, a lifespan of the open-channel SSD may be reduced, thereby deteriorating data reliability.

SUMMARY

Provided is a host system, which may effectively perform a wear-leveling operation to increase a lifespan of a storage system and improve data reliability, a data processing system including the host system, and a method of operating the host system.

According to embodiments, a host system configured to communicate with a storage system includes a host flash translation layer (FTL) configured to manage a plurality of blocks included in the storage system, wherein the host FTL includes a block assignment module configured to generate priority information indicating priorities of free blocks from among the plurality of blocks based on erase count values of the free blocks, and wherein the host FTL is configured to assign a free block having a lowest erase count value, from among the free blocks, for a data write operation based on the priority information; a counting circuit configured to count a number of erase operations performed on each of the plurality of blocks; and an interface circuit configured to transmit to the storage system a block address along with an access request to the storage system, the block address indicating a position of the assigned free block.

According to embodiments, a method of operating a host system configured to communicate with a storage system including a plurality of blocks includes counting a number of erase operations performed on the plurality of blocks; generating a sorting data structure based on erase count values of first to (N−1)-th free blocks of the plurality of blocks, wherein N is an integer greater than or equal to 2; generating an N-th free block by controlling the storage system to perform an erase operation on a block of the plurality of blocks; updating the sorting data structure based on an N-th erase count value of the N-th free block; and assigning a free block having a lowest erase count value, from among the first to N-th free blocks, for a data write operation according to the updated sorting data structure.

According to embodiments, a data processing system including a storage system includes a storage device including at least one flash memory device, wherein each flash memory device of the at least one flash memory device includes a plurality of blocks; and a controller including a first interface circuit configured to receive from an external device an access request for the plurality of blocks and an erase request for the plurality of blocks, the controller being configured to control an access operation on the plurality of blocks based on the access request, and an erase operation on the plurality of blocks based on the erase request, wherein, based on a first block from among the plurality of blocks being erased prior to a second block from among the plurality of blocks being erased in response to the erase request, the first block is changed into a first free block prior to the second block being changed into a second free block, and based on a first erase count value of the first block being higher than a second erase count value of the second block, the second block is assigned for a data write operation prior to the first block.

BRIEF DESCRIPTION OF THE DRAWINGS

Embodiments of the disclosure will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
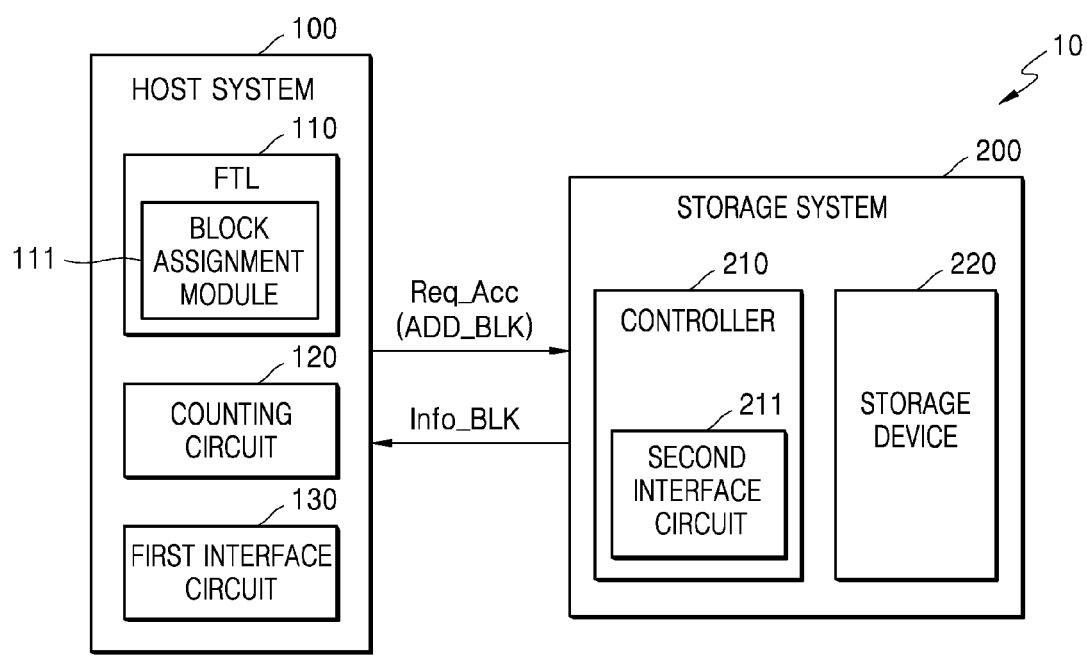
FIG. 1 is a block diagram of a data processing system according to an embodiment.

FIG. 1 is a block diagram of a data processing system 10 according to an embodiment.

Referring to FIG. 1, the data processing system 10 may include a host system 100 and a storage system 200. Also, the storage system 200 may include a controller 210 and a storage device 220. The host system 100 may provide a data write request or a data read request to the storage system 200. In addition, in response to a data erase request from the host system 100, the storage system 200 may perform an erase operation on data about a region indicated by the host system 100. The erase operation may be performed in various units. In an example, the storage system 200 may include a plurality of blocks, for example memory blocks, and the erase operation may be performed in units of blocks indicated by the host system 100.

The storage system 200 may include storage media configured to store data in response to a request from the host system 100. As an example, the storage system 200 may include at least one solid-state drive (SSD). When the storage system 200 includes an SSD, the storage device 220 may include a plurality of flash memory devices, for example NAND flash memory chips, configured to store data in a non-volatile manner. In an embodiment, the storage device 220 may correspond to one flash memory device. In an embodiment, the storage device 220 may include a memory card including at least one flash memory chip.

When the storage system 200 includes a flash memory device, the flash memory device may include a two-dimensional (2D) NAND memory array or a three-dimensional (3D) (or vertical) NAND (V-NAND) memory array. The 3D memory cell array may be monolithically formed in at least one physical level of a circuit associated with operations of arrays of memory cells having an active region provided above a silicon substrate or operations of the memory cells, wherein the associated circuit may be above or within the silicon substrate. The term "monolithic" may mean that layers of each level of the 3D memory array are directly deposited on the layers of each underlying level of the 3D memory array.

In an embodiment, the 3D memory cell array may include vertical NAND strings in which at least one memory cell is located on another memory cell in a vertical direction. The at least one memory cell may include a charge trap layer.

The following patent documents, which are hereby incorporated by reference, disclose suitable configurations for 3D memory arrays, in which the 3D memory array is configured at a plurality of levels, with word lines and/or bit lines shared between levels: U.S. Pat. Nos. 7,679,133; 8,553,466; 8,654,587; 8,559,235; and US Pat. Pub. No. 2011/0233648.

As another example, the storage system 200 may include various other kinds of memories. For example, the storage system 200 may include a non-volatile memory. The non-volatile memory may include various kinds of memories, such as magnetic random access memory (MRAM), spin-transfer torque MRAM, conductive bridging RAM (CBRAM), ferroelectric RAM (FeRAM), phase-change RAM (PRAM), resistive RAM (RRAM), nanotube RAM, polymer RAM (PoRAM), nano floating gate memory (NFGM), holographic memory, molecular electronics memory, or insulator resistance change memory.

The host system 100 may communicate with the storage system 200 through various interfaces. According to an embodiment, the host system 100 may communicate with the storage system 200 through one of various interface protocols, such as a universal serial bus (USB) protocol, a multimedia card (MMC) protocol, a peripheral component interconnect-express (PCI-E) protocol, an advanced technology attachment (ATA) protocol, a serial ATA (SATA) protocol, a parallel ATA (PATA) protocol, a small computer system interface (SCSI) protocol, an enhanced small device interface (ESDI) protocol, and an intelligent drive electronics (IDE). Also, non-volatile memory express (NVMe) may be used as an interface optimized for the storage system 200, such as an SSD, and an NVMe interface may be applied to the data processing system 10 according to an embodiment.

As an example of the storage system 200, the storage system 200 may include an open-channel SSD. In the open-channel SSD, a flash translation layer (FTL) 110 may be included in the host system 100. Thus, various kinds of management operations on the storage system 200 may be performed by the host system 100. As an example, the host system 100 may perform a translation operation between a logical address and a physical address indicating a position at which actual data will be stored, and the host system 100 may provide the physical address to the storage system 200 and access data. The FTL 110 may be provided on a side of the host system 100, and may be referred to as a host FTL.

According to an embodiment, the host system 100 may include a first interface circuit 130 together with the FTL 110. Also, the controller 210 may include a second interface circuit 211. Due to communications between the first interface circuit 130 and the second interface circuit 211, the storage device 220 may perform a memory operation in response to a request from the host system 100. As an example, the storage device 220 may perform an erase operation in units of blocks indicated by the host system 100. A block on which the erase operation is performed may be subsequently assigned as a free block used in a data write operation. As an example, valid data stored in a plurality of blocks may be moved to a relatively small number of free blocks due to a garbage collection operation, and an erase operation may be performed on the plurality of blocks, and thus, the storage device 220 may ensure a relatively large number of free blocks.

An erase operation may be frequently performed on the blocks included in the storage device 220. As the number of erase operations increases, a lifespan of a block on which the erase operations are performed may be reduced, and data stored in the block may have lower reliability than data stored in blocks on which a small number of erase operations are performed. When specific blocks are frequently erased and data is written to the frequently erased blocks, the written data may have low reliability. Also, when data is written to the specific blocks, the specific blocks may be more highly likely to be erased again. Thus, lifespans of the specific blocks may be further reduced, thereby reducing the lifespan of the storage system 200.

The host system 100 may perform a wear-leveling operation on the storage system 200 and evenly manage wear levels of the blocks included in the storage device 220. Thus, a lifespan of the storage system 200 may be increased. As an example, the wear-leveling operation may include an operation of managing the assignment of blocks used in a data write operation. According to an embodiment, the host system 100 may control an operation of assigning the blocks, or for example free blocks, based on confirmation results of erase count values of the blocks included in the storage device 220.

According to an embodiment, the host system 100 may include a block assignment module 111. When an operation related to the assignment of blocks is controlled by software, the block assignment module 111 may be included in the FTL 110. In addition, the host system 100 may further include a counting circuit 120 configured to count erase count values of blocks included in the storage device 220.

The host system 100 and the storage system 200 may transmit and receive various pieces of information related to the assignment of the blocks. The first interface circuit 130 and the second interface circuit 211 may transmit and receive the various pieces of information through various kinds of interfaces, such as an NVMe interface. In an example of operations, the storage system 200 may transmit block information Info_BLK indicating the number and positions of the blocks included in the storage system 200 to the host system 100 during an initialization process. Also, during an access process, such as a data write operation, the host system 100 may transmit an access request Req_Acc to the storage system 200 and also, transmit a block address ADD_BLK indicating a free block assigned for the data write operation to the storage system 200.

The counting circuit 120 may count an erase count value of each of the plurality of blocks included in the storage system 200. As an example, a garbage collection operation may be performed under the control of the host system 100. During the garbage collection operation, valid data stored in a specific block, for example a first block, included in the storage system 200 may be moved to another block. When an erase operation is performed on the first block, the first block may be changed into a free block. In this case, the counting circuit 120 may increase an erase count value of the first block.

When the free block is assigned for the data write operation, the block assignment module 111 may control an assigned order of blocks based on erase count values of the counting circuit 120. As an example, the block assignment module 111 may refer to erase count values of free blocks, from among a plurality of blocks included in the storage system 200 and preferentially assign a free block having a relatively low erase count value for the data write operation. To this end, the block assignment module 111 may perform a sorting operation on the free blocks based on the erase count values, and the sorting operation may be performed by managing a sorting data structure based on erase count values of a plurality of free blocks. The sorting data structure may be based on various types of data management operations. As an example, a minimum heap-based data structure in which a free block having a lower erase count value has a higher priority may be applied.

In an example, when the free block is assigned for the data write operation, assignment priorities of the free blocks may be determined based on the above-described sorting data structure. The block assignment module 111 may preferentially assign a free block having a lowest erase count value for a data write operation. When the data write operation is performed on the free block, valid data stored in the block in which the data write operation is performed may be moved to another block afterward, and the corresponding block may be more highly likely to be erased. Thus, the numbers of erase counts of the plurality of blocks may be equalized, or substantially equalized. Accordingly, the number of erase counts of a specific block may be prevented from being excessively increased, and thus, some blocks may be prevented from being processed as bad blocks or reliability degradation may be prevented.

When the free block to be assigned for the data write operation is selected as described above, the host system 100 may transmit a block address ADD_BLK indicating a selected block to the storage system 200. As an example, the FTL 110 may include a translation module configured to translate a logical address into a physical address, and the translation module may generate the block address ADD_BLK indicating the selected block.

When a first generated free block is first assigned for a data write operation without utilizing an erase count value in the environment of the open-channel SSD, a free block having a high erase count value may be highly likely to be first assigned for the data write operation. In this case, relatively large cost may be incurred in a wear-leveling operation of the open-channel SSD. In contrast, according to an embodiment, erase count values of the plurality of blocks may be dynamically managed on the side of the host system 100, and the sorting data structure of free blocks may be managed based on the erase count values, and thus, the assignment of the free blocks may be controlled. As a result, the host system 100 may dynamically perform a wear-leveling operation on the storage system 200. In addition, as a capacity of the storage system 200 increases, an operation of managing the erase count values of the plurality of blocks may correspond to an operation of managing large data. In an embodiment, since the operation according to the above-described embodiment may be controlled on the side of the host system 100 having a relatively large resource, the wear-leveling operation may be efficiently performed.

Although FIG. 1 illustrates an example in which the host system 100 performs the wear-leveling operation on one SSD, the host system 100 may perform the wear-leveling operation according to the above-described embodiment on a plurality of SSDs. According to an embodiment, the block assignment module 111 may be implemented in common for the plurality of SSDs or separately implemented for each of the plurality of SSDs, and thus, a block assignment operation may be separately managed in units of SSDs.

Figure 2:
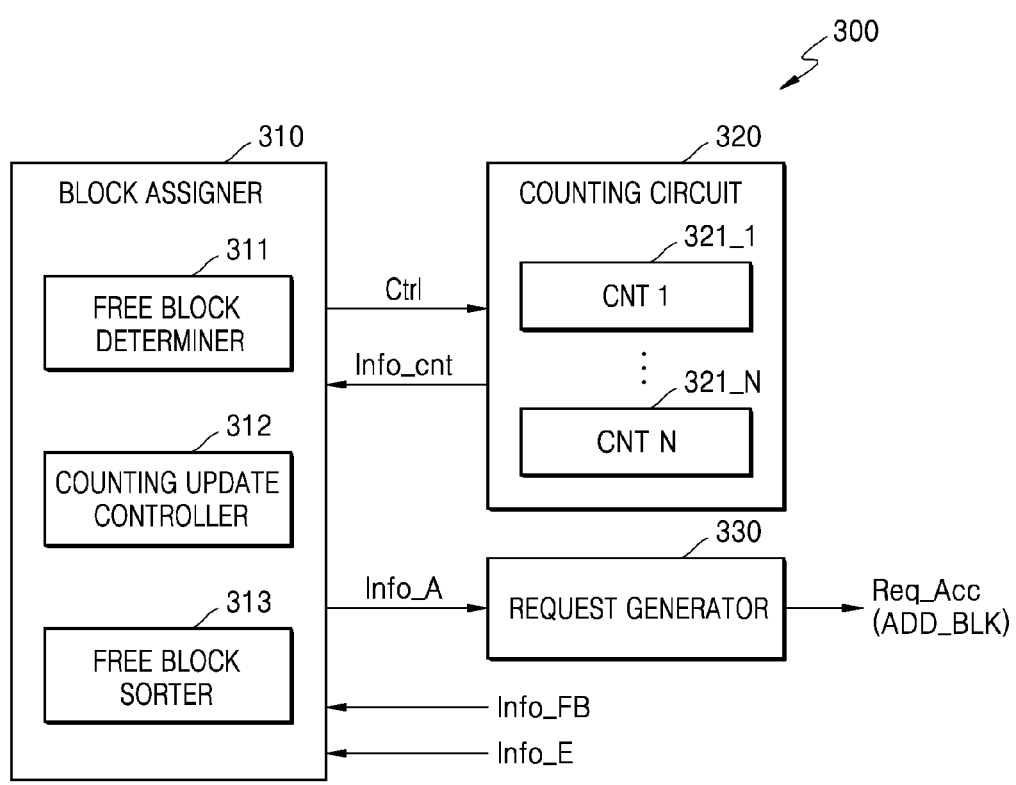
FIG. 2 is a block diagram of an example of a host system according to an embodiment.

FIG. 2 is a block diagram of an example of a host system 300 according to an embodiment. FIG. 2 illustrates an example in which a wear-leveling operation is performed on N blocks included in a storage system.

Referring to FIG. 2, a host system 300 may include a block assigner 310, a counting circuit 320, and a request generator 330. Also, the block assigner 310 may include a free block determiner 311, a counting update controller 312, and a free block sorter 313. Also, the counting circuit 320 may include first to N-th counters 321_1 to 321_N configured to count erase count values of N blocks, for example first to N-th blocks, of the storage system.

Functions performed by the block assigner 310, from among components shown in FIG. 2, may be implemented with hardware, software, or a combination thereof. That is, although the free block determiner 311, the counting update controller 312, and the free block sorter 313 are illustrated as separate hardware configurations in FIG. 2, some of the components may be implemented with a software module including programs.

The block assigner 310 may receive first information Info_FB indicating blocks corresponding to free blocks, from among a plurality of blocks, and receive second information Info_E indicating a block to be erased. The first information Info_FB and the second information Info_E may be generated using various methods. In an example, while the host system 300 is controlling the storage system, information about blocks, which are currently in a free-block state, may be determined using various management operations. In addition, when an erase request is provided to the storage system, information about a block to be erased may be determined, and the first information Info_FB and the second information Info_E may be generated in the host system 300 based on the determined information.

In addition, the block assigner 310 may provide a control signal Ctrl for increasing an erase counting value of a block to be erased to the counting circuit 320, and receive third information Info_cnt indicating erase count values of the first to N-th blocks from the counting circuit 320. As an example, the counting update controller 312 may generate a control signal Ctrl, based on the second information Info_E indicating the block to be erased, and control the counting circuit 320.

The free block determiner 311 may determine free blocks, which may be assigned during a data write operation, based on the first information Info_FB, and provide information about blocks corresponding to the free blocks. The free block sorter 313 may generate fourth information Info_A indicating a result obtained by sorting the free blocks based on erase count values of the free blocks, and the fourth information Info_A may include information about blocks to be preferentially assigned. The request generator 330 may provide an access request Req_Acc for a memory operation, such as a data write operation and a data read operation, to the storage system and also, output a block address ADD_BLK indicating a position of a block to be accessed. According to the above-described embodiment, a free block to be accessed, or a free block to which data is to be written, may be selected based on the fourth information Info_A. As an example, a block address ADD_BLK indicating a free block having a lowest erase count value, from among a plurality of free blocks, may be output.

Although the present embodiment illustrates an example in which the request generator 330 selects the free block to be assigned for the data write operation based on the fourth information Info_A, the disclosure is not limited thereto. As an example, the free block sorter 313 may determine information about a free block to be most preferentially assigned based on a sorting data structure included therein. The host system 300 may be implemented such that the free block sorter 313 may directly provide an address of the free block to be assigned for a data write operation to the request generator 330. In an embodiment, the host system 300 may be implemented such that a host FTL includes a translation module configured to generate a physical address, and the translation module generates a block address indicating a free block selected based on the fourth information Info_A and provides the block address to the request generator 330.

Figure 3:
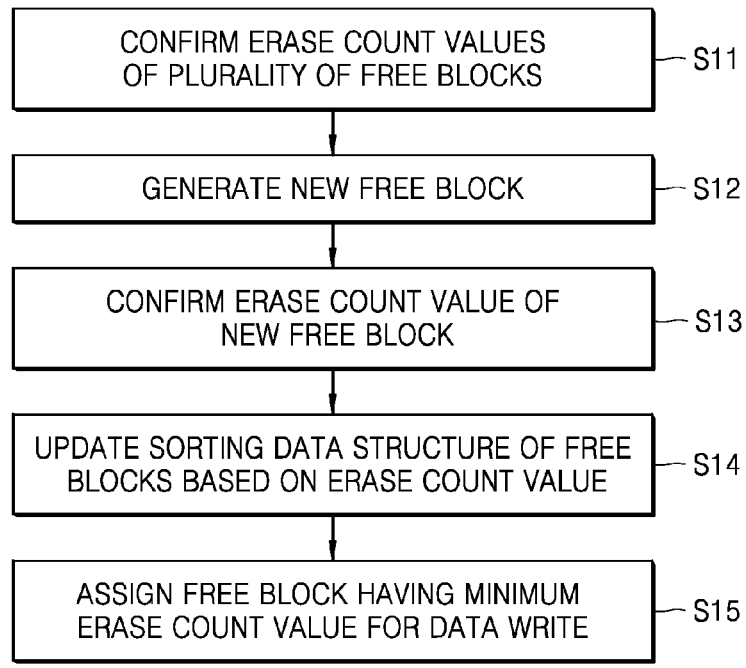
FIGS. 3 and 4 are flowcharts of examples of a method of operating a data processing system according to embodiments.
Figure 4:
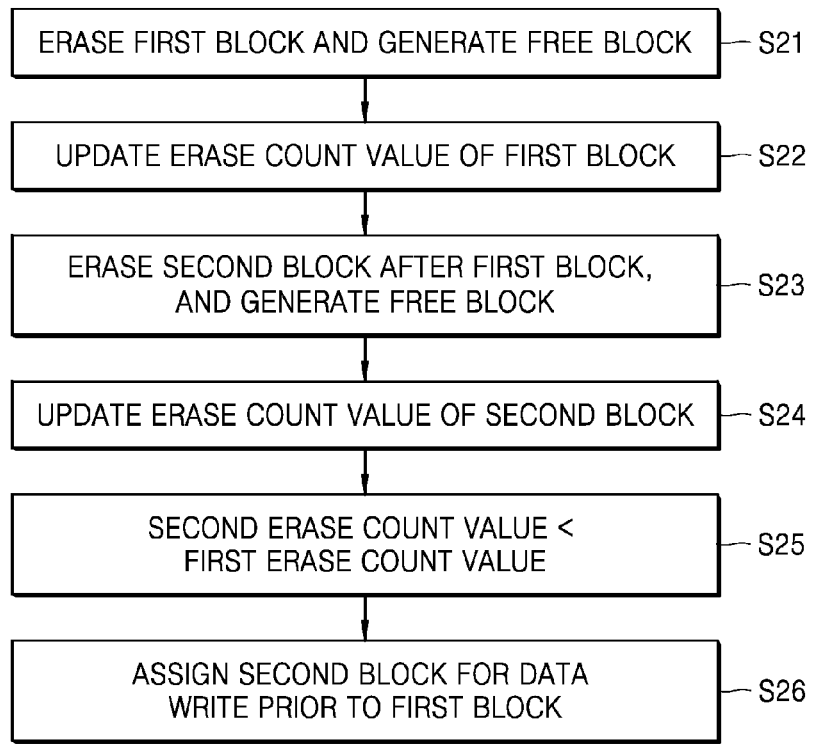

FIGS. 3 and 4 are flowcharts illustrating methods of operating a data processing system according to embodiments. The data processing system may include a host system and a storage system according to embodiments. In embodiments, the operations of FIGS. 3 and 4 may be performed by one or more of the elements of data processing system 10, data processing system 500, data processing 600, or any other embodiment of a data processing system.

Referring to FIG. 3, the host system may control data access to the storage system and an erase operation on blocks, and the host system may perform a counting operation whenever a plurality of blocks included in the storage system are erased, and confirm erase count values of the plurality of blocks due to the counting operation, at operation S11. Also, the host system may provide an erase request for the blocks due to various operations, such as a garbage collection operation, and generate a new free block at operation S12. Also, an erase count value of the new free block may be confirmed at operation S13.

The host system may manage a sorting data structure of free blocks to manage the order of assignment of the free blocks, based on erase count values of the free blocks, and update the sorting data structure due to the generation of the new free block at operation S14. As an example, the sorting data structure may be differently configured based on the erase count value of the new free block, and priorities of free blocks to be assigned for a data write operation may vary according to the updated sorting data structure. An operation of assigning a new free block to be subsequently used to write data may be performed based on the updated sorting data structure. In this case, a free block having a minimum erase count value, from among a plurality of free blocks, may be preferentially assigned for a data write operation at operation S15.

An example of an assignment operation on a first block and a second block is illustrated in FIG. 4. Referring to FIG. 4, the host system may request an erase operation on the first block included in the storage system, and thus, the storage system may erase the first block and generate a free block at operation S21. Also, the host system may update an erase count value corresponding to the first block during the erase operation on the first block at operation S22. After the first block is erased, the host system may request an erase operation on the second block included in the storage system, and the storage system may erase the second block and generate a free block at operation S23, and the host system may update an erase count value corresponding to the second block at operation S24.

Thereafter, when a new free block is assigned for a data write operation, the erase count value of the first block may be compared with the erase count value of the second block, and it may be confirmed that the erase count value of the second block, which is generated as the free block later than the first block, is lower than the erase count value of the first block at operation S25. Thus, the host system may assign the second block for the data write operation prior to the first block at operation S26.

Figure 5:
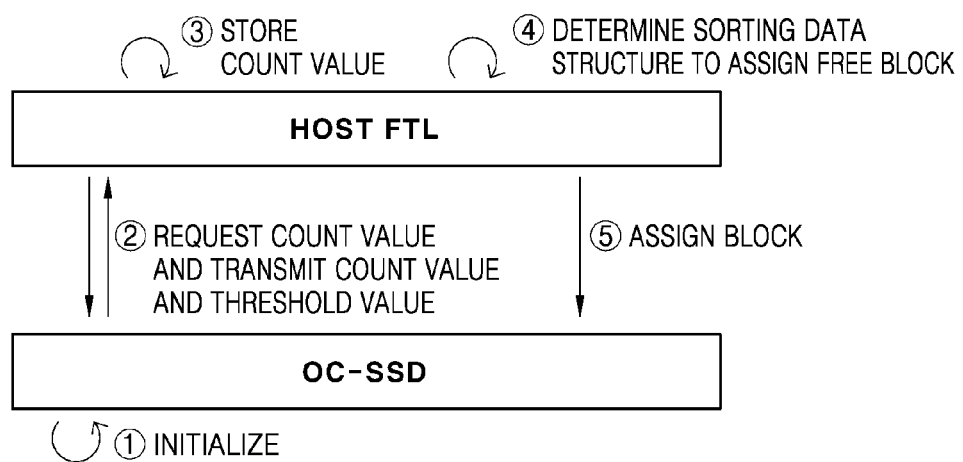
FIG. 5 is a conceptual diagram of an example of an operation of a data processing system according to an embodiment.

FIG. 5 is a conceptual diagram of an example of an operation of a data processing system according to an embodiment. FIG. 5 illustrates a host FTL included in a host system and an open-channel SSD (or OC-SSD), which may be an example of a storage system. In embodiments, the operations of FIG. 5 may be performed by one or more of the elements of data processing system 10, data processing system 500, data processing 600, or any other embodiment of a data processing system.

To begin, an initialization operation may be performed on the open-channel SSD at operation ①. During the initialization operation, the host system may request the transmission of erase count values of a plurality of blocks that are stored in the open-channel SSD in a non-volatile manner, and the open-channel SSD may transmit information including the erase count values of the plurality of blocks in response to the request at operation ②. Also, in some embodiments, the open-channel SSD may further transmit information related to a threshold value of an erase count of a block to the host system. The threshold value of the erase count may indicate a value of the erase count at which the block may remain reliable. The host system may manage an assignment operation of the block or perform a management operation on a bad block considering the threshold value of the erase count.

The host system may store an erase count value provided from the open-channel SSD during the initialization operation at operation ③. Subsequently, erase count values of the plurality of blocks may be updated during an erase operation on the open-channel SSD. Also, erase count values of free blocks of the plurality of blocks may be confirmed, a sorting data structure may be managed, based on the confirmed values, and determined to assign a free block for a data write operation at operation ④. Furthermore, the host system may transmit an access request indicating the data write operation to the open-channel SSD based on the determination result and also, transmit information indicating the assignment result of the free block to the open-channel SSD at operation ⑤.

Figure 6:
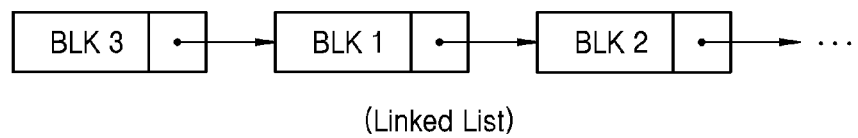
FIGS. 6 and 7 illustrate examples of data structures configured to assign free blocks used to write data according to embodiments.
Figure 7:
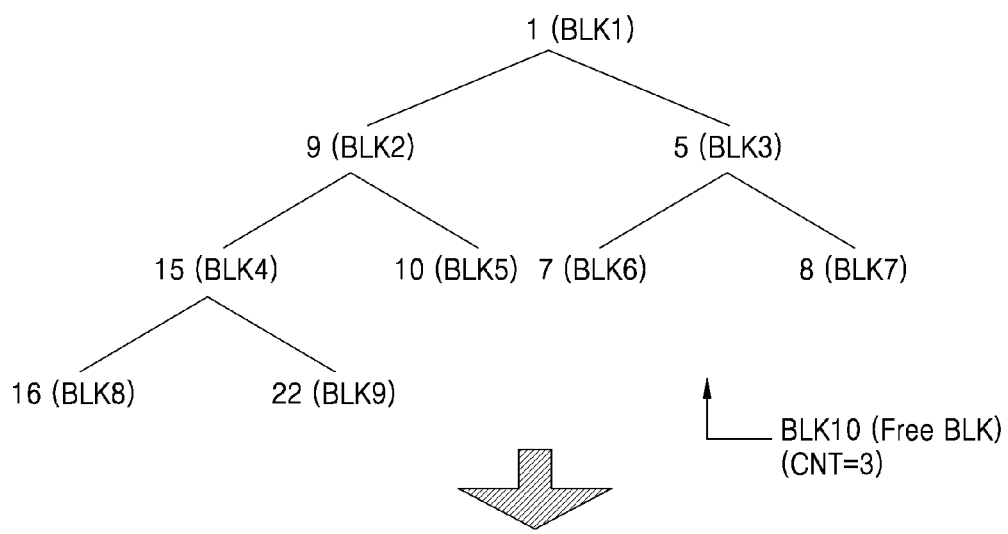
Figure 7:
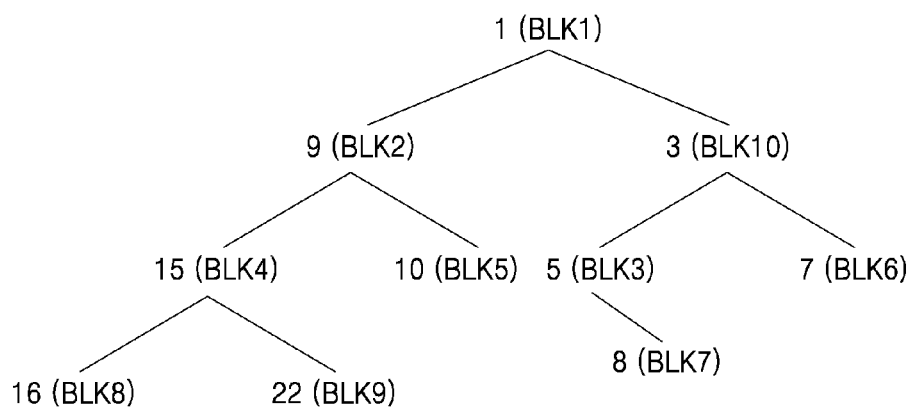

FIGS. 6 and 7 illustrate examples of material structures configured to assign free blocks used to write data, according to embodiments. FIG. 6 illustrates an example in which a free block is assigned based on the management of a typical linked list, according to embodiments. FIG. 7 illustrates an example in which a free block is assigned based on the management of the sorting data structure according to the embodiments.

Referring to FIG. 6, a host system may use the typical liked list to manage the assignment of blocks. In this case, when blocks are erased, the erased blocks may be sequentially included as free blocks in a list. As an example, when a third bock BLK 3 corresponds to a free block on which an erase operation has most recently been performed, the third block BLK 3 may be located last in the linked list. A first block BLK 1 may be included in the linked list prior to the third block BLK 3, and a second block BLK 2 may be included in the linked list prior to the first block BLK 1.

In this case, blocks to be newly assigned for a data write operation may be sequentially assigned based on information of the linked list. As an example, a block that is first included as a free block in the linked list may be preferentially assigned for the data write operation. As an example, the second block BLK 2 that is first included in the linked list may be assigned for the data write operation earlier than other blocks. The above-described assignment operation may be conducted without consideration of erase counts of the blocks. That is, even if the second block BLK 2 has a relatively high erase count value, the second block BLK 2 may be preferentially assigned for the data write operation. As a result, the lifespan of the second block BLK 2 may be rapidly reduced.

In contrast, FIG. 7 illustrates a sorting data structure of first to ninth blocks BLK 1 to BLK 9 according to embodiments. FIG. 7 illustrates an example in which a minimum-heap sorting data structure is applied to an operation of assigning the first to ninth blocks BLK 1 to BLK 9.

Various kinds of sorting structures may be applied to the sorting data structure according to the embodiment. As an example, FIG. 7 illustrates a minimum-heap sorting data structure having a binary tree structure. In this case, a heap tree may have a tree structure using indices of an arrangement. In the present embodiment, the arrangement may correspond to the first to ninth blocks BLK 1 to BLK 9, and the indices may correspond to erase count values of the first to ninth blocks BLK 1 to BLK 9. Also, since the sorting data structure may be based on a minimum heap, an index of a parent node may be configured to be lower than an index of a child node.

In an example, the erase count values of the first to ninth blocks BLK 1 to BLK 9 may be managed. Because the first block BLK 1, from among the first to ninth blocks BLK 1 to BLK 9 corresponding to free blocks, has a lowest erase count value, the first block BLK 1 may correspond to a highest parent node in the sorting data structure. Thus, when free blocks are assigned for the next data write operation, a highest priority may be applied to the first block BLK 1, followed by the third block BLK 3 having an erase count value of 5, the sixth block BLK 6 having an erase count value of 7, and finally the seventh block BLK 7 having an erase count value of 8.

In this case, an erase operation may be performed on a tenth block BLK 10 of a storage system. Thus, it may be assumed that the tenth block BLK 10 is newly generated as a free block and an erase count of the tenth block BLK 10 corresponds to 3. In this case, a host system may include the tenth block BLK 10 in a sorting data structure of free blocks, and a priority of the tenth block BLK 10 may be determined based on an erase count value of the tenth block BLK 10. As shown in FIG. 7, a tree structure of the free blocks may be newly updated based on erase count values, and the tenth block BLK 10 may have a priority over the third block BLK 3, the sixth block BLK 6, and the seventh block BLK 7 during an operation of assigning the free blocks.

Although FIG. 7 illustrates a heap sorting data structure as an example applicable to embodiments, the embodiments are not limited thereto, and various kinds of data structures, such as quick sort, merge sort, and insertion sort, may be applied to the embodiments. A free block having a minimum erase count value may be preferentially assigned for a data write operation using various sorting data structures.

Figure 8:
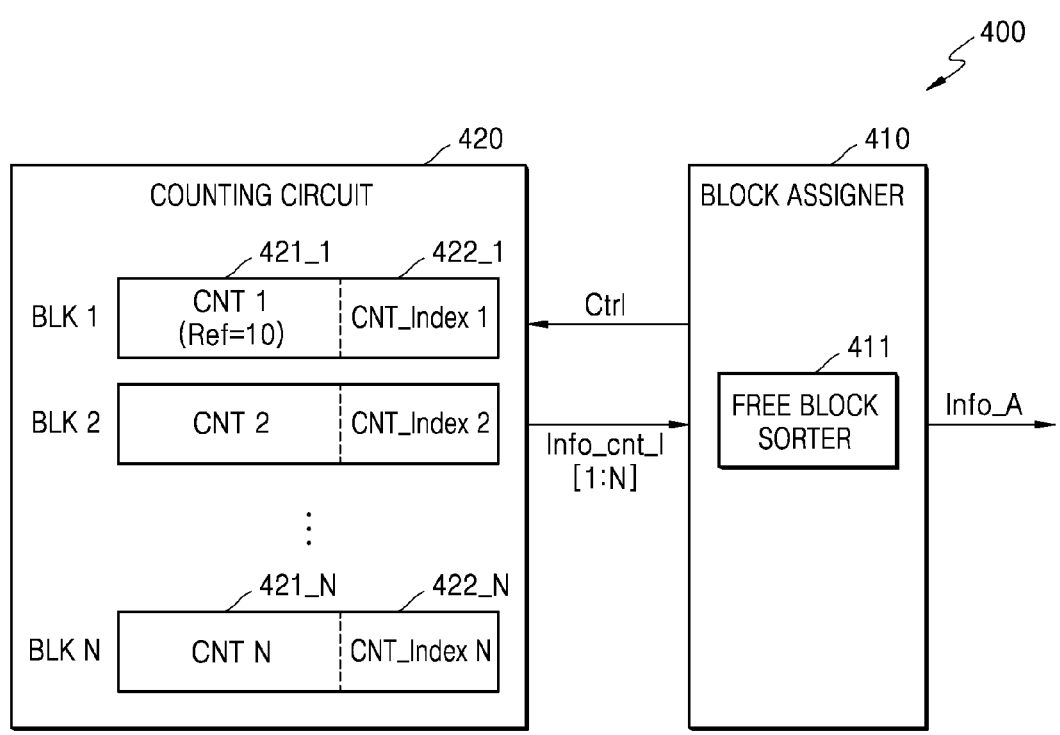
FIG. 8 is a block diagram of an example of a host system according to an embodiment.

FIG. 8 is a block diagram of an example of a host system 400 according to an embodiment. FIG. 8 illustrates an example in which a wear-leveling operation is performed on N blocks included in a storage system, and index information having values that are obtained based on counting results is used.

Referring to FIG. 8, the host system 400 may include a block assigner 410 and a counting circuit 420. The block assigner 410 may include a free block sorter 411. Also, the counting circuit 420 may include first to N-th counters 421_1 to 421_N configured to count erase count values of first to N-th blocks BLK 1 to BLK N of the storage system and first to N-th index counters 422_1 to 422_N configured to generate index information Info_cnt_I[1:N] about the erase count value of each of the first to N-th blocks BLK 1 to BLK N. In embodiments, the host system 400 may include various other components configured to control the storage system and perform a data access operation according to the above-described embodiments.

According to the above-described embodiments, the free block sorter 411 may manage a sorting data structure, based on erase count values of free blocks, and generate information Info_A indicating a sorting result of the free blocks. The information Info_A may be used during a subsequent process of selecting a free block to be assigned for a data write operation. According to an embodiment, the free block sorter 411 may receive the above-described index information Info_cnt_I[1:N] and generate information Info_A indicating the sorting result of the free blocks based on the index information Info_cnt_I[1:N].

The counting circuit 420 may perform a counting operation whenever an erase operation on the first to N-th blocks BLK 1 to BLK N is performed. As an example, referring to the first block BLK 1, after the first counter 421_1 performs a counting operation by a predetermined count value, a count value of the first counter 421_1 may be reset. Also, the first index counter 422_1 corresponding to the first counter 421_1 may perform a counting operation whenever the count value of the first counter 421_1 corresponds to a set value. Counting results of the first index counter 422_1 may be used as index information Info_cnt_I[1] about the first block BLK1 used to assign a free block. FIG. 8 illustrates a case in which the first index counter 422_1 performs a counting operation whenever the first counter 421_1 counts 10.

The free block sorter 411 may perform the sorting operation according to embodiments by using the index information Info_cnt_I[1:N] corresponding to the first to N-th blocks BLK 1 to BLK N. As an example, a block having a small value of index information Info_cnt_I[1:N] may be preferentially assigned as a free block used in the data write operation. As an example, when the above-described sorting data structure that is based on the minimum heap is applied, tree structures of the first to N-th blocks BLK 1 to BLK N may be formed, based on the index information Info_cnt_I [1:N], and a block having a small value of index information Info_cnt_I[1:N] may have a priority during a process of assigning free blocks.

According to an embodiment, a frequency of operations of updating index information Info_cnt_I[1:N] about the free blocks may be reduced. Thus, a frequency of sorting operations using a data structure may be reduced, thereby reducing resource consumption for managing the data structure.

Figure 9:
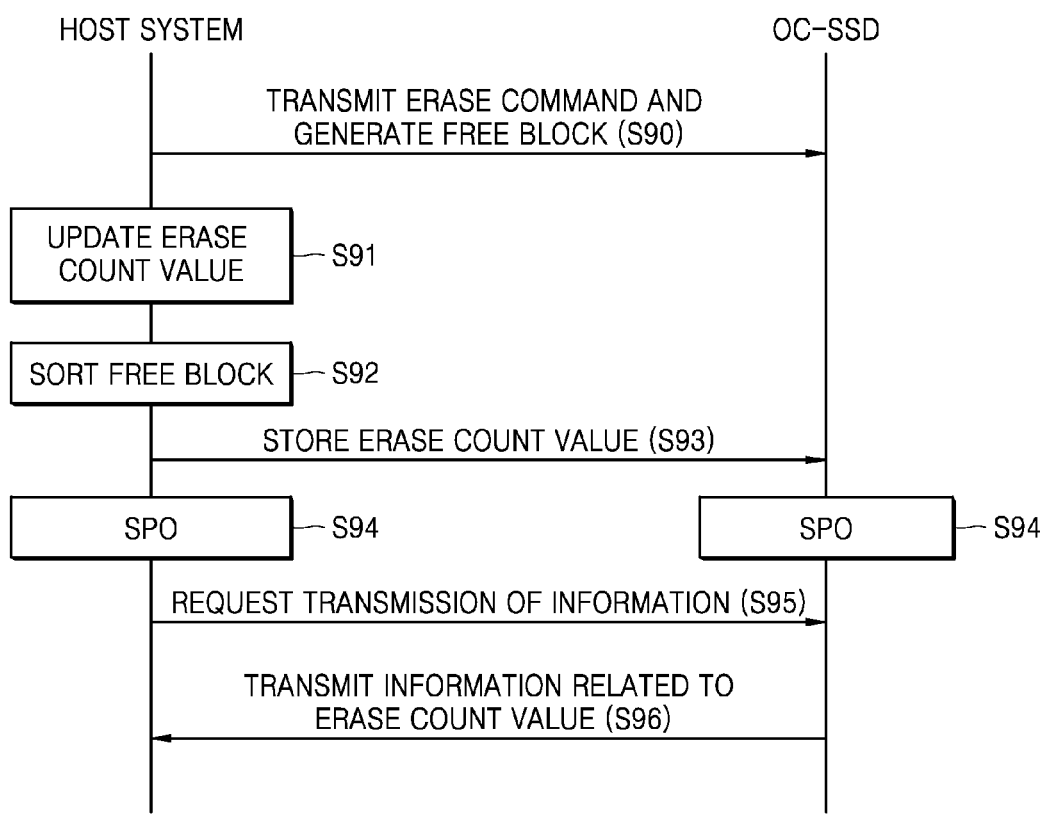
FIG. 9 is a conceptual diagram of an example of an operation of a data processing system according to an embodiment.

FIG. 9 is a conceptual diagram of an example of an operation of a data processing system according to an embodiment.

Referring to FIG. 9, a host system may control various memory operations on an open-channel SSD (or OC-SSD). Also, the host system may include a host FTL, which may perform various management operations on the open-channel SSD. In embodiments, the operations of FIG. 9 may be performed by one or more of the elements of data processing system 10, data processing system 500, data processing 600, or any other embodiment of a data processing system.

As an example, during a garbage collection operation, the host system may transmit an erase command for at least one block to the open-channel SSD and thus, generate a free block at operation S90. Also, the host system may update an erase count value corresponding to an erased block and perform a sorting operation based on a sorting data structure using erase count values of free blocks at operation S91. Furthermore, since a new free block is generated as described above, the sorting data structure may include the newly generated free block at operation S92.

The host system may store information related to the erase count values of the free blocks in the open-channel SSD at specific time points or periodically at operation S93. That is, the host system may temporarily store information related to the various management operations in internal random access memory (RAM), and periodically or aperiodically store the information in a non-volatile storage space of the open-channel SSD.

Thereafter, the data processing system including the host system and the open-channel SSD may be powered off. As an example, unintended sudden power-off (SPO) may occur at operation S94. When power is applied again to the data processing system, an initialization operation may be performed between the host system and the open-channel SSD, and various kinds of pieces of information may be transmitted and received between the host system and the open-channel SSD during the initialization operation. In this case, the host system may request the transmission of information related to the erase count values of the free blocks to the open-channel SSD at operation S95, and the open-channel SSD may transmit information corresponding to the request to the host system at operation S96.

The host system may perform the sorting operation according to the above-described embodiment based on the information related to the erase count values of the free blocks received from the open-channel SSD. That is, the sorting data structure may be generated at a side of the host system so that free blocks having relatively low erase count values may be preferentially assigned for a data write operation. The generated sorting data structure may be used to assign the free blocks to a subsequent data write operation.

Figure 10:
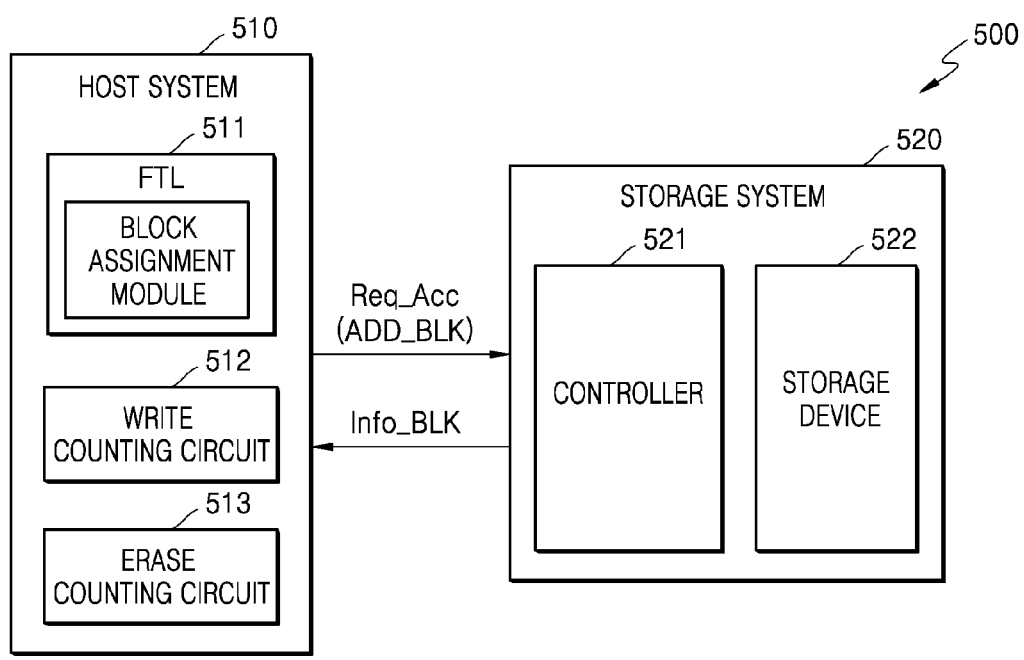
FIG. 10 is a block diagram of a data processing system according to an embodiment.

FIG. 10 is a block diagram of a data processing system 500 according to an embodiment.

Referring to FIG. 10, the data processing system 500 may include a host system 510 and a storage system 520. The storage system 520 may include a controller 521 and a storage device 522. Also, the host system 510 may include an FTL 511, a write counting circuit 512, and an erase counting circuit 513, and the FTL 511 may include a block assignment module. According to the above-described embodiments, the storage system 520 may transmit block information Info_BLK to the host system 510. Also, according to the above-described embodiments, the host system 510 may assign a free block having a relatively low erase count value for a data write operation and transmit an access request Req_Acc along with a block address ADD_BLK indicating the assigned free block to the storage system 520.

Lifespans of blocks included in the storage system 520 may be reduced as the number of write operations increases with an increase in the number of erase operations. According to an embodiment, the write counting circuit 512 and the erase counting circuit 513 may count a write count value and an erase count value, respectively. When the free block according to the embodiments is assigned for the data write operation, the write count value and the erase count value may be used in an assignment operation.

As an example, the write counting circuit 512 and the erase counting circuit 513 may perform a counting operation in various units. One block may include a plurality of pages. A write operation may be performed in units of pages, while an erase operation may be performed in units of blocks. In this case, the write counting circuit 512 may generate a write count value in the units of pages or in the units of blocks. That is, the write counting circuit 512 may provide each write count value in the units of pages or provide a write count value corresponding to the total number of write operations performed on a block.

In addition, according to embodiments, when a sorting data structure configured to assign a free block for a data write operation, a write count value of a block may be higher than an erase count value of the block. Thus, index information according to the above-described embodiments may be applied to the write count value. That is, whenever the write count value reaches a predetermined value, an index counting operation may be performed, and an operation of assigning free blocks may be performed based on a combination of an erase count value of each of the free blocks and index information related to a write operation.

According to an embodiment, the erase count value and the write count value may be utilized in various manners. As an example, a priority may be applied to any one of the erase count value and the write count value during the operation of assigning the free blocks. In an embodiment, the erase count value may be combined with the write count value, and the assignment operation may be controlled such that a free block of which a lifespan is reduced to a low degree may be preferentially assigned for the data write operation.

Figure 11:
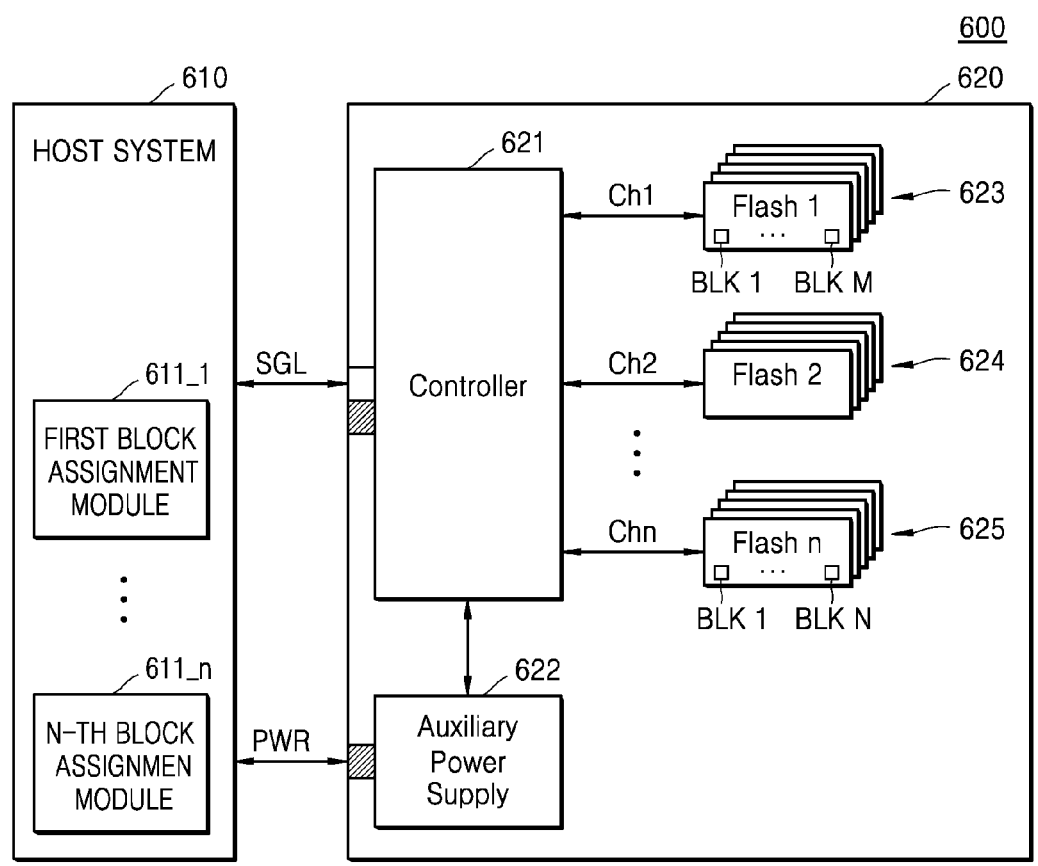
FIG. 11 is a block diagram of a data processing system according to an embodiment.

FIG. 11 is a block diagram of a data processing system 600 according to an embodiment. FIG. 11 illustrates an example in which an SSD 620 includes a plurality of flash memory devices, and each of the flash memory devices includes a plurality of blocks.

Referring to FIG. 11, the data processing system 600 may include a host system 610 and the SSD 620. The SSD 620 may correspond to the open-channel SSD according to the above-described embodiment. The SSD 620 may transmit and receive signals to and from the host system 610 through a signal connector SGL and receive power through a power connector PWR. The SSD 620 may include a controller 621, an auxiliary power supply 622, and a plurality of memory systems, for example memory systems 623, 624, and 625. Each of the memory systems 623, 624, and 625 may include at least one flash memory device as a storage device. Also, each flash memory device may include at least one die, and at least one block may be arranged in each die.

According to the above-described embodiments, the controller 621 may communicate with the memory systems 623, 624, and 625 through a plurality of channels Ch1 to Chn. Also, the controller 621 may access data from a selected block in response to an access request and a block address provided from the host system 610. Also, the host system 610 may include at least one block assignment module, for example block assignment modules 611_1 through 611_n, and a free block to which data is to be written may be assigned due to a block assignment operation according to the above-described embodiments.

The controller 621 may independently access the memory systems 623, 624, and 625 through the plurality of channels Ch1 to Chn, and the host system 610 may perform a management operation on blocks included in the SSD 620 in various units. The management operation may be, for example, an operation of managing a sorting data structure according to the number of erase counts. As an example, a first flash memory device connected to the controller 621 through a first channel Ch1 may include M blocks BLK 1 to BLK M, an n-th flash memory device connected to the controller 621 through an n-th channel Chn may include N blocks BLK 1 to BLK N, and the sorting data structure may be managed in units of flash memory devices.

The host system 610 may manage an erase count value of each channel, each flash memory device, or each die included in each flash memory device and generate a sorting data structure based on the managed erase count value. FIG. 11 illustrates an example in which the sorting data structure is managed in the units of flash memory devices. A first block assignment module 611_1 may manage erase count values of the M blocks BLK 1 to BLK M of the first flash memory device. Also, the first block assignment module 611_1 may manage the sorting data structure so that a free block having a relatively low erase count value, from among the M blocks BLK 1 to BLK M, may be preferentially assigned based on erase count values of free blocks. Furthermore, in the n-th flash memory device that is accessed through a separate channel, an n-th block assignment module 611_n may manage erase count values of N blocks BLK 1 to BLK N and assign free blocks using the sorting data structure based on the embodiments.

FIG. 11 illustrates an example in which a block assignment module is arranged to correspond to a plurality of flash memory devices connected to different channels of the plurality of channels Ch1 to Chn, embodiments are not limited thereto. As an example, as described above, a block assignment module may be separately implemented for each flash memory device or each die of the same channel as a unit of a sorting data structure. Although only one SSD is illustrated in FIG. 11, the host system 610 may manage a plurality of SSDs and manage an operation of assigning free blocks on the plurality of SSDs.

Figure 12:
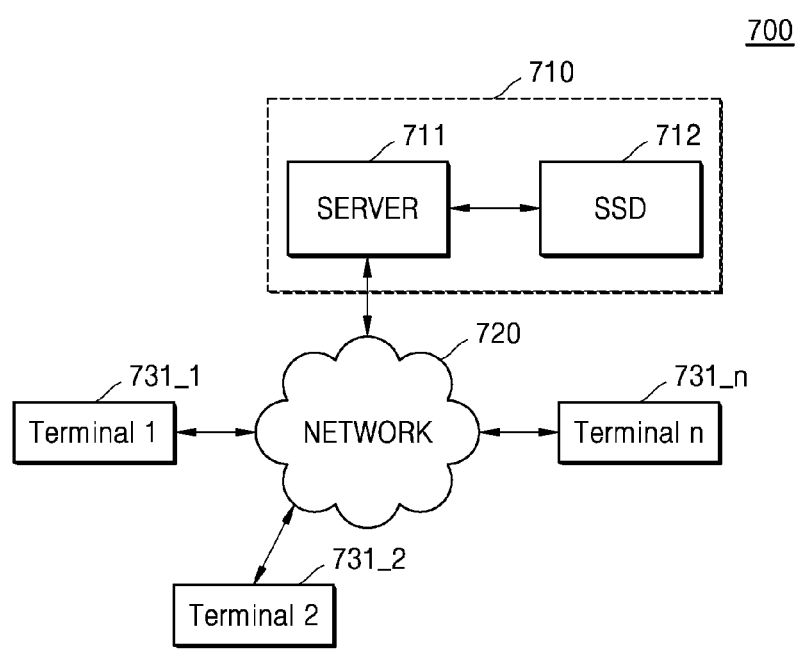
FIG. 12 is a block diagram of a network system including a server system according to an embodiment.

FIG. 12 is a block diagram of a network system 700 including a server system 710 according to an embodiment. FIG. 12 illustrates a plurality of terminals, for example computing nodes, along with the server system 710. The server system 710 may be embodied using a data processing system according to the above-described embodiments.

Referring to FIG. 12, the network system 700 may include a plurality of terminals 731_1 to 731_n, which configured to perform communication operations through a network 720, together with the server system 710. The server system 710 may include a server 711 and an SSD 712 serving as a storage system. The server 711 may function as the host system according to the above-described embodiments.

The server 711 may process requests transmitted from the plurality of terminals 731_1 to 731_n connected to the network 720. As an example, the server 711 may store data provided by the plurality of terminals 731_1 to 731_n in the SSD 712. Also, according to embodiments, the server 711 may perform a management operation on blocks included in the SSD 712. As an example, the server 711 may determine lifespans of the blocks included in the SSD 712, select a free block assigned for a data write operation based on the determination result, and dynamically perform a wear-leveling operation. In addition, according to the above-described embodiments, the determination of the lifespans of the blocks may be performed using the number of erase counts and/or the number of write counts, and a free block having a relatively low erase count value or a relatively low write count value may be preferentially assigned for the data write operation.

As is traditional in the field of the inventive concepts, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

While the inventive concept has been particularly shown and described with reference to embodiments thereof, it will be understood that various changes in form and details may be made therein without departing from the spirit and scope of the following claims.

What is claimed is:

1. A host system configured to communicate with a storage system, the host system comprising:
   a host flash translation layer (FTL) configured to:
      manage a plurality of blocks included in the storage system,
      generate priority information indicating priorities of free blocks from among the plurality of blocks based on index count values associated with erase count values of the free blocks, and
      assign a free block having a lowest index count value, from among the free blocks, for a data write operation based on the priority information;
   a counting circuit configured to count a number of erase operations performed respectively on each of the plurality of blocks, and to increment an index count value of the index count values based on a corresponding erase count value of the erase count values reaching an integer multiple of a predetermined set value, wherein the predetermined set value is greater than 1 erase count; and
   an interface circuit configured to transmit to the storage system a block address along with an access request to the storage system, the block address indicating a position of the assigned free block.

2. The host system of claim 1, wherein the interface circuit is further configured to receive block information about the plurality of blocks from the storage system, and
   wherein the counting circuit is further configured to generate the index count values.

3. The host system of claim 1, wherein the block address includes physical address information indicating the assigned free block.

4. The host system of claim 1, wherein the host FTL is further configured to:
   determine the free blocks, from among the plurality of blocks;
   increase an erase count value of a block, from among the plurality of blocks, on which an erase operation is performed; and
   set the priorities of the free blocks based on the index count values of the free blocks.

5. The host system of claim 1, wherein the host FTL is further configured to manage a sorting data structure of the free blocks such that the free block having the lowest index count value is assigned for the data write operation, based on the index count values of the free blocks.

6. The host system of claim 5, wherein the sorting data structure corresponds to a minimum heap-sorting data structure having a tree structure determined according to the index count values.

7. The host system of claim 5, wherein a first block of the plurality of blocks is included in the free blocks based on a request for the storage system to perform an erase operation on the first block, and
   wherein the host FTL is further configured to update the sorting data structure based on a first index count value of the first block.

8. The host system of claim 7, wherein, a second block is included in the sorting data structure prior to the first block, and
   wherein based on a second index count value of the second block being higher than the first index count value, the host FTL is further configured to assign the first block for the data write operation prior to the second block.

9. The host system of claim 1, wherein the host system is configured to periodically store the erase count values of the free blocks, and to receive the erase count values of the free blocks from the storage system during an initialization operation.

10. The host system of claim 1, wherein the host system is configured to manage a plurality of flash memory devices included in the storage system, wherein the host FTL is further configured to separately manage the priority information for each flash memory device of the plurality of flash memory devices.

11. The method of claim 1, wherein the predetermined set value comprises 10 erase counts.

12. The method of claim 1, further comprising sorting the priority information based on the incremented index count value.

13. A method of operating a host system configured to communicate with a storage system comprising a plurality of blocks, the method comprising:
    counting a number of erase operations performed respectively on each of the plurality of blocks;
    generating a sorting data structure based on index count values associated with erase count values of a first free block to a (N−1)th free block of the plurality of blocks, wherein N is an integer greater than or equal to 2;
    incrementing an index count value of the index count values based on a corresponding erase count value of the erase count values reaching an integer multiple of a predetermined set value, wherein the predetermined set value is greater than 1 erase count;
    generating an N-th free block by controlling the storage system to perform an erase operation on a block of the plurality of blocks;
    updating the sorting data structure based on an index count value of the N-th free block; and
    assigning a free block having a lowest index count value, from among the first to N-th free blocks, for a data write operation according to the updated sorting data structure.

14. The method of claim 13, wherein the host system comprises a host flash translation layer (FTL) and is configured to manage the storage system, and
    wherein the storage system comprises an open-channel solid-state drive (SSD).

15. The method of claim 13, further comprising:
    transmitting a request for storing the erase count values of the first free block to the (N−1)th free block; and
    receiving information comprising the erase count values of the first free block to the (N−1)th free block from the storage system during an initialization process between the storage system and the host system.

16. The method of claim 13, wherein the first free block is included in the sorting data structure prior to the N-th free block, and
    wherein, based on the index count value of the N-th free block being lower than an index count value of the first free block, the N-th free block is assigned for the data write operation prior to the first free block.

17. The method of claim 13, wherein the sorting data structure corresponds to a minimum heap-sorting data structure having a tree structure based on the index count values.

18. A data processing system comprising a storage system, wherein the storage system comprises:
    a storage device comprising at least one flash memory device, wherein each flash memory device of the at least one flash memory device comprises a plurality of blocks; and a controller comprising a first interface circuit configured to receive from an external device an access request for the plurality of blocks and an erase request for the plurality of blocks, the controller being configured to control an access operation on one or more of the plurality of blocks based on the access request, and an erase operation on the one or more of the plurality of blocks based on the erase request, wherein, based on a first block from among the plurality of blocks being erased prior to a second block from among the plurality of blocks being erased in response to the erase request, the first block is changed into a first free block prior to the second block being changed into a second free block, and wherein based on an index count value of the first free block being higher than an index count value of the second free block, the second free block is assigned for a data write operation prior to the first free block, wherein at least one of the index count value of the first free block and the index count value of the second free block is incremented based on at least one of an erase count value of the first free block or an erase count value of the second free block reaching an integer multiple of a predetermined set value, wherein the predetermined set value is greater than 1 erase count.

19. The data processing system of claim 18, wherein the external device comprises a host system,
wherein the host system comprises:
a host flash translation layer (FTL) configured to manage the storage system and a sorting data structure, based on index count values of free blocks included in the plurality of blocks;
a counting circuit configured to count a number of erase operations performed respectively on each of the plurality of blocks; and
a second interface circuit configured to interface with the storage system, and
wherein the host FTL is configured to assign the second free block for the data write operation prior to the first free block, based on the sorting data structure.

20. The data processing system of claim 19, wherein the host system is configured to periodically transmit a storage request for erase count values of the free blocks through the second interface circuit to the storage system, and
wherein the storage system is configured to transmit information related to the erase count values of the free blocks through the first interface circuit to the host system during an initialization operation of the data processing system.

* * * * *